United States Patent [19]

Adams

[11] 4,003,134
[45] Jan. 18, 1977

[54] AUTOMATIC LIGHTED LEVEL AND ANGLE FINDER

[76] Inventor: David Adams, Box 161, Spring Branch Road, Jeremiah, Ky. 41826

[22] Filed: Aug. 6, 1975

[21] Appl. No.: 602,307

[52] U.S. Cl. .................................. 33/348; 33/366; 33/399
[51] Int. Cl.² ...................................... G01C 9/06
[58] Field of Search .................... 33/366, 348, 399; 340/282

[56] References Cited

UNITED STATES PATENTS

| 1,901,793 | 3/1933 | Allen | 33/399 |
|---|---|---|---|
| 2,892,260 | 6/1959 | Mozur | 33/348 |
| 3,196,552 | 7/1965 | Richards | 33/366 |
| 3,233,235 | 2/1966 | Wright | 33/366 |
| 3,584,387 | 6/1971 | Sturm | 33/366 |
| 3,861,052 | 1/1975 | Siegfried | 33/366 |

Primary Examiner—William D. Martin, Jr.
Attorney, Agent, or Firm—Clarence A. O'Brien; Harvey B. Jacobson

[57] ABSTRACT

An automatic lighted level and a angle finder has a frame provided with a planar surface arranged for abutting against an object the orientation of which is to be determined or adjusted. An electrically energized visual indicator is mounted in the frame of the device for indicating when the planar surface of the frame is oriented at a predetermined angle by the closing of an angle-sensing switch including a reel assembly adjustably mounted in an opening provided in the frame and connected to the indicator and to a source of electrical power for energizing the indicator by closing an electrical circuit connecting the indicator to the source of electrical power when the switch is rotated relative to the frame to an angle corresponding to the angle of an object whose angular orientation is being determined. Alternatively, the planar surface may be placed on the object and the latter moved until its orientation corresponds to a predetermined angle set on the switch. A circular scale graduated in degrees cooperating with a pointer provides a visual indication of the angular setting of the switch.

12 Claims, 7 Drawing Figures

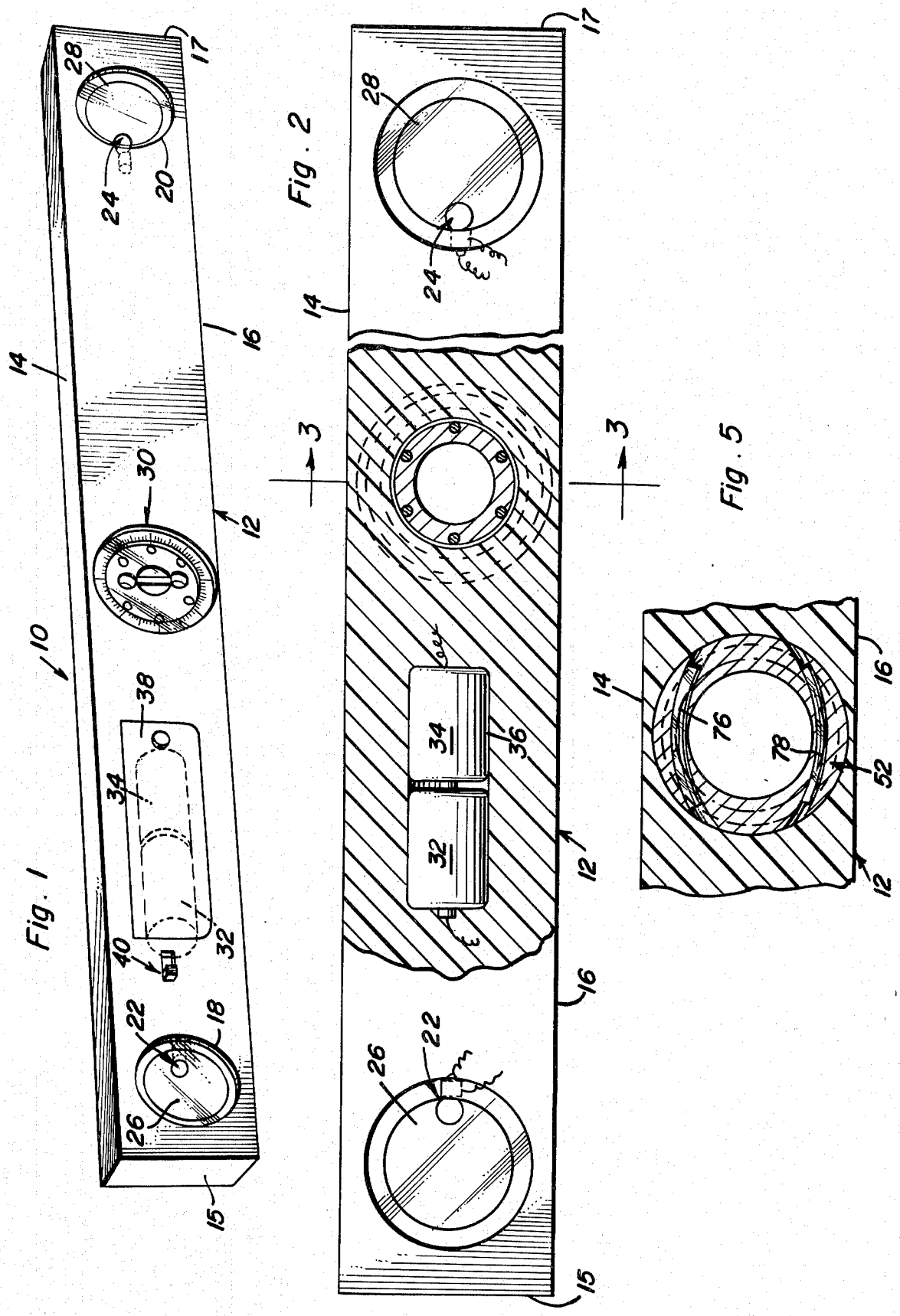

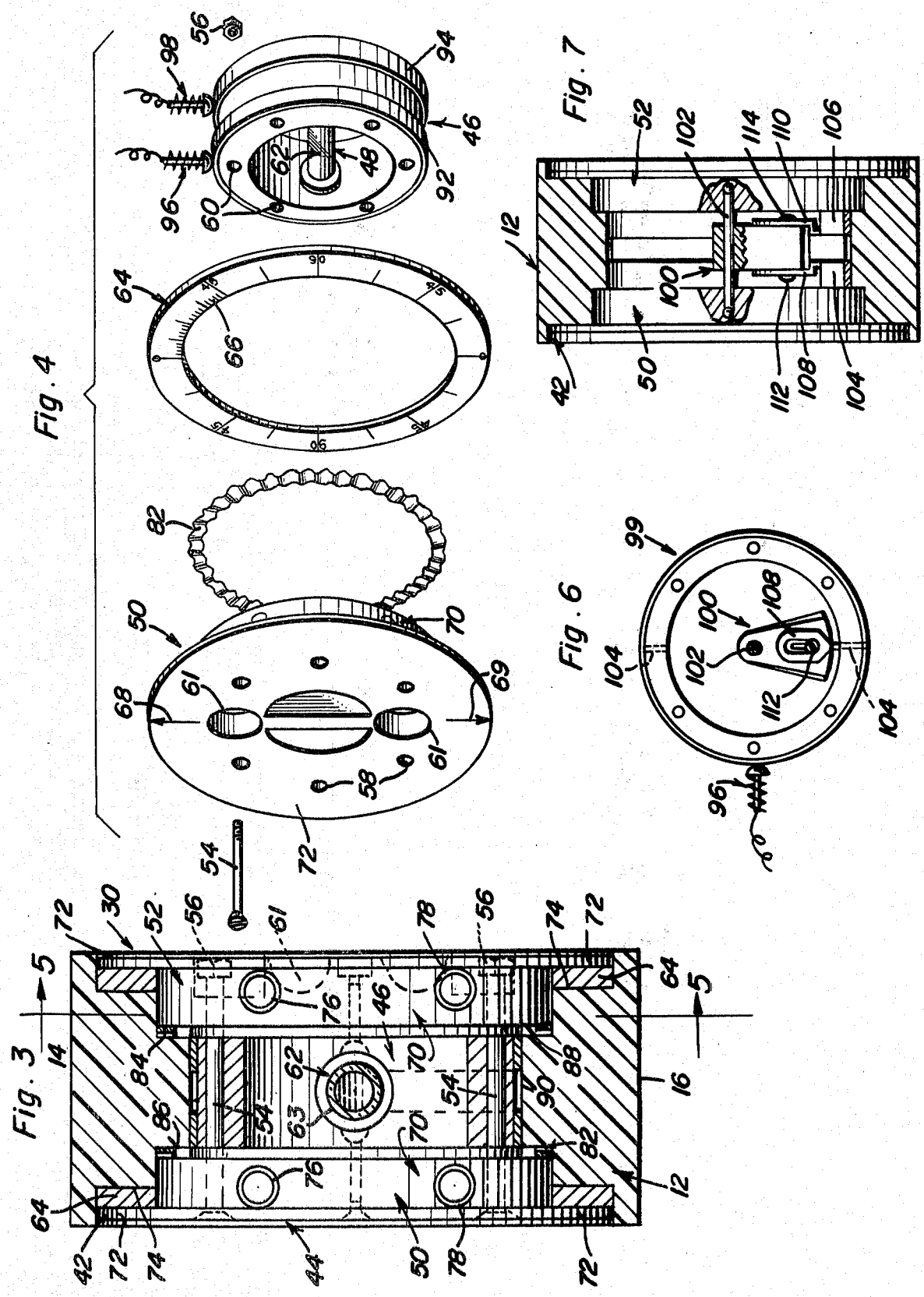

4,003,134

AUTOMATIC LIGHTED LEVEL AND ANGLE FINDER

BACKGROUND OF THE INVENTION

1. Field of the Invention

This invention relates generally to a level indicating device and particularly to a carpenter's level which provides a visual indication when the angular setting of a gravity switch device corresponds to the angular orientation of a planar surface of the level.

2. Description of the Prior Art

It is generally known to construct a carpenter's level with an electrical indication energized by a gravity-responsive switch rotatably mounted on the frame of the level so as to be set at either a predetermined angular orientation for an object, or to the orientation at which an object is disposed. See, for example, U.S. Pat. No. 3,196,552, issued July 27, 1965 to P. T. Richards.

The known adjustable lighted level, as set forth in Pat. No. 3,196,552, however, must always be used from the same side of the frame of the level. In addition, the known device employs a mercury switch, and the like, as an indication of vertical levelness, as well as for energization of the associated lamp.

SUMMARY OF THE INVENTION

It is an object of the present invention to provide an improved lighted carpenter's level of the kind having an adjustable gravity-responsive switch wherein the switch assembly provides reliable readings more easily read than with known devices of this kind.

It is another object of the present invention to provide a lighted carpenter's level which is as easily used by making a visual reading of a bubble as by visual reading of an energized lamp, and the like.

It is still another object of the present invention to provide a lighted carpenter's level of the kind having an adjustable gravity-responsive switch wherein the level may be employed by reading, and adjusting, the switch from either side of the level and to any angle.

These and other objects are achieved according to the present invention by providing an automatic lighted level and angle finder having: a frame including a planar surface arranged for abutting against an object the angular orientation of which object is to be determined and adjusted as desired; an electrical energized visual indicator mounted in the frame for indicating when the planar surface of the frame is oriented at an angle corresponding to the angular orientation of the object which the planar surface is abutting; and an angle-sensing switch adjustably mounted in the frame and connected to the indicator and a source of electrical power for being set at an angle relative to the planar surface of the frame and energizing the indicator by closing an electrical circuit connecting the source of electrical power when the angle of the switch corresponds to the angle of the planar surface of the frame.

The level-sensing switch advantageously includes a reel assembly disposed in an opening provided in the frame of the device. This reel assembly preferably comprises an annular body rotatably disposed in the opening provided in the frame, with a gravity-responsive electrical switch being mounted within the annular reel body, and a side wall removably affixed to the reel body and provided with structure permitting manipulation of the reel body for selectively rotating same with respect to the frame so as to cause the gravity-responsive switch to close an associated electrical circuit when the planar surface of the frame corresponds to the setting of the switch.

The gravity-responsive electrical switch may be either a mercury switch, preferably in the form of a dumbbell, or a mechanical switch, such as a plumb associated with a contact mounted on the reel body.

The reel assembly advantageously further includes a ring provided with indicia arranged for indicating degrees of the circumference of the ring, with the ring being arranged between the side wall and the frame.

The side wall advantageously includes an annular portion having a disc-like flange constructed from a transparent material and arranged retainingly overlying the ring. In this regard, the opening provided in the frame is stepped down into the frame for providing a seat for the ring.

The reel assembly preferably further includes a pair of substantially liquid-filled bubble-forming arcuate vials curved to conform to an inner circumference of and mounted in opposed relationship within the annular portion of the side wall, the uppermost vial at any time forming a reading bubble. The opening provided in the frame is preferably a through opening, with the reel body being disposed essentially within the through opening, and there being a pair of side walls, indicia provided rings, and reel body retaining pressure rings. One each of the aforementioned elements is disposed in the through opening on either side of of the real body.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an automatic lighted level and angle finder according to the present invention.

FIG. 2 is a fragmentary, partly schematic, side elevational view, partly broken away and in section, showing the level of FIG. 1.

FIG. 3 is a sectional view taken generally along the line 3—3 of FIG. 2.

FIG. 4 is an exploded, perspective view of a portion of a reel assembly according to the present invention.

FIG. 5 is a fragmentary, sectional view taken generally along the line 5—5 of FIG. 3.

FIG. 6 is a schematic, side elevational view showing a portion of a modified reel assembly according to the present invention.

FIG. 7 is a front elevational view, showing the frame of a level in section, and partly broken away and in section, showing the reel assembly embodying the structure of FIG. 6.

DESCRIPTION OF THE PREFERRED EMBODIMENTS

Referring now more particularly to FIGS. 1 and 2 of the drawings, an automatic lighted level and angle finder 10 according to the present invention includes a frame 12 having a pair of spaced, substantially parallel, planar side surfaces 14 and 16 as well as parallel planar end surfaces 15 and 17 arranged for selectively abutting against an object (not shown) the orientation of which is to be determined and/or adjusted.

Two transverse apertures 18 and 20 are advantageously provided in the longitudinally spaced end portions of frame 12, and a pair of conventional lamps 22 and 24 extend into the apertures 18 and 20 to form visual indicators which, when appropriately energized, indicate when the planar surfaces 14, 16 and 15, 17 are oriented at an angle corresponding to the angular orientation being determined or adjusted to. Conventional lenses 26 and 28 may be arranged covering apertures 18 and 20 if desired.

An angle-sensing switch assembly 30 is adjustably mounted on frame 12 and is connected to the lamp 22 and to a conventional source of electrical power such as the illustrated dry cell batteries 32 and 34 operatively disposed within a compartment 36 provided in frame 12. A cover 38 is preferably disposed over the access opening to compartment 36, while a conventional on-off switch 40 may be associated with the batteries for opening the battery circuit and preventing drain of the batteries when the invention is not being used. In this manner, switch assembly 30 may be rotated relative to frame 12 and be set at an angle relative to planar surfaces 14, 16 so as to energize lamps 22, 24 by closing the electrical circuit connecting the lamp 22, 24 to the batteries 32, 34 when the angle of the planar surfaces 14, 16, or surfaces 15 and 17, corresponds to the angle at which switch assembly 30 is set.

Frame 12 is provided with a through opening 42 which receives the level-sensing switch assembly 30. The latter advantageously includes a reel assembly 44 having an annular reel body 46 rotatably disposed in opening 42 and provided with a suitable gravity-responsive electrical switch 48 mounted within the annular reel body 46. Side walls 50 and 52 are removably affixed to body 46 as by a plurality of conventional screws 54 retained as by nuts 56 in matching holes 58 and 60 provided in side walls 50, 52 and body 46, respectively. Side walls 50 and 52 are provided with fingerholes 61 which permit manipulation of side walls 50, 52 and selective rotation of body 46 with respect to frame 12 in order to adjust the angle of switch 48 with respect to frame 12 and particularly with respect to surfaces 14 and 16.

The gravity-responsive switch 48 is illustrated in FIGS. 3 and 4 as being a dumbbell shaped single pole single throw mercury switch 62. As will be appreciated, contacts are disposed in a conventional manner in each of the enlarged ends 63 of switch 62 so as to be connected together by mercury arranged within switch 62 only when ends 63 of switch 62 are in a substantially horizontal, or level, plane relative to the forces of gravity being exerted on the device. Since the operation of such mercury switch is known per se, it will not be described in detail herein. Further, while the illustrated dumbbell shape of switch 62 is considered particularly advantageous for use in constructing a level and angle finder according to the present invention, it will be understood that other suitable configuration of the mercury switch, such as a sphere (not shown) may be employed as desired and considered advantageous as well as other forms of liquid contact switches.

Reel assembly 44 further includes a pair of substantially identical rings 64 each provided with indicia 66 arranged for indicating degrees of the circumference of the rings 64. The indicia 66 is considered to include, and cooperates with, pointer 68 and 69 provided on side walls 50 and 52. As will be readily appreciated from FIGS. 3 and 4 of the drawings, rings 64 are arranged between the side walls 50 and 52 of frame 12, side wall 50 and 52 each including an annular portion 70 having extending therefrom a disc-like flange 72 preferably constructed from a suitable transparent material and arranged retainingly overlying the corresponding rings 64 for permitting viewing of the indicia 66 on rings 64. The outer ends of the holes or bores 58 formed through the side wall 50 are countersunk to receive the heads of the screws 54 and the outer ends of the holes or bores 58 formed through the side wall 52 include counterbores to seatingly receive the nuts 56. As will be appreciated, the pointer 68, 69 is disposed on flange 72 of rings 64 so as to cooperatively overlie the portion of the indicia 66 provided on the respective rings 64. A step 74 is provided on each side of opening 42 in order to form a seat for the rings 64 with the rings 64 advantageously being secured to the associated seat, as formed by the step 74, in order to assure that rings 64 retain their proper orientation with respect to frame 12.

As can be seen from FIG. 5 of the drawings, reel assembly 44 further includes a pair of substantially liquid-filled arcuate vials 76 and 78 curved to conform to the circumference of and mounted in opposed relationship within annular portion 70 of each of the side walls 50, 52. As will be appreciated, the uppermost vial 76, 78 of each of the side walls 50, 52 will form a reading bubble 80 to facilitate use of the invention. As will be appreciated, despite the fact that side walls 50, 52 rotate with respect to frame 12, one of the vials 76, 78 of each of the side walls 50, 52 will always be in what can be considered the "uppermost" position relative to frame 12 so as to provide a visual reading bubble 80 for use by a user (not shown) of the invention.

Referring again to FIGS. 3 and 4 of the drawings, reel assembly 44 still further includes a pair of corrugated spring pressure rings 82 and 84 each arranged abutting and frictionally restraining reel body 46 from movement relative to frame 12 and a predetermined force is applied to one of the side walls 50, 52 in order to overcome the frictional restraining force exerted by rings 82 and 84. Opening 42 is provided with a pair of spaced further steps 86 and 88 forming respective seats for rings 82 and 84, and provided between further steps 86 and 88 is a cylindrical surface 90 which forms a bearing for body 46. As will be appreciated, body 46 fits into cylindrical surface 90 in the manner of a journal and bearing so that body 46 may smoothly rotate within opening 42.

Body 46 is provided with a pair of spaced contact rings 92 and 94 with which resiliently biased wiping contacts 96 and 98 are respectively associated. Contacts 96 and 98 will be connected to, for example, lamps 22, 24 and batteries 32, 34, respectively, in order to insert switch 48, to which rings 92 and 94 are connected, within the electrical circuit connecting the batteries 32, 34 to the lamps 22, 24. As can be readily understood, the number of lamps and batteries may vary from the number illustrated.

Referring now to the embodiment of the invention shown in FIGS. 6 and 7 of the drawings, a reel body 99 includes a gravity-responsive switch in the form of a plumb 100 pivotally mounted at the central axis of reel body 99 as by a shaft 102 anchored within the associated side walls 50, 52 of the reel assembly for rotational movement relative to reel body 99. At least one, and preferably the illustrated pair, of electrical contacts 104 and 106 are advantageously disposed within reel body 99 and arranged for wiping contact with the adjustable points 108 and 110 of plumb 100 to close an electrical circuit through the switch formed by plumb 100 and from the batteries 32, 34 to the, for example, lamps 22, 24. As can be readily seen from FIGS. 6 and 7, the contact, or wiping, points 108 and 110 of plumb 100 are adjustably mounted on the body portion of plumb 100 as by conventional set screws 112 and 114.

As will be appreciated from the above description and from the drawings, an automatic lighted level and angle finder according to the present invention provides a rugged, reliable, and versatile device capable of carrying out any leveling operation performed by hand.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An automatic lighted level and angle finder, comprising, in combination:
    a. a frame having a planar surface arranged for abutting against an object the orientation of which is to be determined and adjusted;
    b. electrical energized visual indicator means mounted in the frame for indicating when the planar surface is oriented at an angle corresponding to the angular orientation being determined; and
    c. angle-sensing switch means adjustably mounted on the frame and connected to the indicator means and a source of electrical power for being set at an angle relative to the planar surface and energizing the indicator means by closing an electrical circuit connecting the indicator means to the source of electrical power when the orientation of the planar surface corresponds to the angle set on the switch means, the frame being provided with an opening receiving the level sensing switch means, and the level sensing switch means including a reel assembly, comprising, in combination:
    1. an annular reel body rotatably disposed in the opening provided in the frame;
    2. a gravity-responsive electrical switch mounted in the reel body; and
    3. a side wall removably affixed to the reel body and provided with manipulating means for permitting selective rotation of the side wall and the reel body with respect to the frame, the reel assembly further including a pair of substantially liquid-filled arcuate vials curved to conform to the circumference of and mounted in opposed relation within the side wall, the uppermost vial in any orientation of the planar surface forming a reading bubble.

2. An automatic lighted level and angle finder, comprising, in combination:
    a. a frame having a planar surface arranged for abutting against an object the orientation of which is to be determined and adjusted;
    b. electrical energized visual indicator means mounted in the frame for indicating when the planar surface is oriented at an angle corresponding to the angular orientation being determined; and
    c. angle-sensing switch means adjustably mounted on the frame and connected to the indicator means and a source of electrical power for being set at an angle relative to the planar surface and energizing the indicator means by closing an electrical circuit connecting the indicator means to the source of electrical power when the orientation of the planar surface corresponds to the angle set on the switch means, the frame being provided with an opening receiving the level sensing switch means, and the level sensing switch means including a reel assembly, comprising, in combination:
    1. an annular reel body rotatably disposed in the opening provided in the frame;
    2. a gravity-responsive electrical switch mounted in the reel body; and
    3. a side wall removably affixed to the reel body and provided with manipulating means for permitting selective rotation of the side wall and the reel body with respect to the frame, the reel assembly further including a corrugated spring pressure ring abutting and frictionally restraining the reel body from movement unless a predetermined force is applied to the side wall.

3. A structure as defined in claim 2, wherein the reel assembly further includes a ring provided with indicia arranged for indicating degrees of the circumference of the ring, the ring being arranged between the side wall and reel body.

4. A structure as defined in claim 3, wherein the side wall includes an annular portion having a disc-like flange conducted from a transparent material and arranged retainingly overlying the ring, the opening in the frame being stepped down into the frame for providing a seat for the ring.

5. An automatic lighted level and angle finder, comprising, in combination:
    a. a frame having a planar surface arranged for abutting against an object the orientation of which is to be determined and adjusted;
    b. electrical energized visual indicator means mounted in the frame for indicating when the planar surface is oriented at an angle corresponding to the angular orientation being determined; and
    c. angle-sensing switch means adjustably mounted on the frame and connected to the indicator means and a source of electrical power for being set at an angle relative to the planar surface and energizing the indicator means by closing an electrical circuit connecting the indicator means to the source of electrical power when the orientation of the planar surface corresponds to the angle set on the switch means, the frame being provided with an opening receiving the level sensing switch means, and the level sensing switch means including a reel assembly, comprising, in combination:
    1. an annular reel body rotatably disposed in the opening provided in the frame;
    2. a gravity-responsive electrical switch mounted in the reel body; and
    3. a side wall removably affixed to the reel body and provided with manipulating means for permitting selective rotation of the side wall and the reel body with respect to the frame, the reel assembly further including a ring provided with indicia arranged for indicating degrees of the circumference of the ring, the ring being arranged between the side wall and reel body, the side wall including an annular portion having a disc-like flange constructed from a transparent material and arranged retainingly overlying the ring, the opening in the frame being stepped down into the frame for providing a seat for the ring, the reel assembly further including a pair of substantially liquid-filled arcuate vials curved to conform to the circumference of and mounted in opposed relation within the annular portion of the side wall, the uppermost vial in any orientation of the planar surface forming a reading bubble.

6. A structure as defined in claim 5, wherein the gravity-responsive electrical switch is a dumbbell shaped single pole single throw mercury switch.

7. A structure as defined in claim 5, wherein the gravity-responsive switch is a plumb pivotally mounted in the reel body for rotational movement relative to the reel body, and at least one electrical contact disposed within the reel body and arranged for wiping contact with the plumb to close an electrical circuit through the switch and indicator means.

8. An automatic lighted level and angle finder, comprising, in combination:
   a. a frame having a planar surface arranged for abutting against an object the orientation of which is to be determined and adjusted;
   b. electrical energized visual indicator means mounted in the frame for indicating when the planar surface is oriented at an angle corresponding to the angular orientation being determined; and
   c. angle-sensing switch means adjustably mounted on the frame and connected to the indicator means and a source of electrical power for being set at an angle relative to the planar surface and energizing the indicator means by closing an electrical circuit connecting the indicator means to the source of electrical power when the orientation of the planar surface corresponds to the angle set on the switch means, the frame being provided with an opening receiving the level sensing switch means, and the level sensing switch means including a reel assembly, comprising, in combination:
   1. an annular reel body rotatably disposed in the opening provided in the frame;
   2. a gravity-responsive electrical switch mounted in the reel body; and
   3. a side wall removably affixed to the reel body and provided with manipulating means for permitting selective rotation of the side wall and the reel body with respect to the frame, the reel assembly further including a ring provided with indicia arranged for indicating degrees of the circumference of the ring, the ring being arranged between the side wall and reel body, the side wall including an annular portion having a disc-like flange constructed from a transparent material and arranged retainingly overlying the ring, the opening in the frame being stepped down into the frame for providing a seat for the ring, the reel assembly further including a corrugated spring pressure ring abutting and frictionally restraining the reel body from movement unless a predetermined force is applied to the side wall.

9. A structure as defined in claim 8, wherein the reel assembly further includes a pair of substantially liquid-filled arcuate vials curved to conform to the circumference of and mounted in opposed relation within the annular portion of the side wall, the uppermost vial in any orientation of the planar surface forming a reading bubble.

10. A structure as defined in claim 9, wherein the opening in the frame is a through opening, the reel body being disposed centrally within the through opening, and there being a pair of side walls, indicia provided rings, and pressure rings, one each of the aforementioned elements being disposed in the through opening on either side of the centrally disposed reel body.

11. A structure as defined in claim 10, wherein the gravity-responsive electrical switch is a dumbbell shaped single pole single throw mercury switch.

12. A structure as defined in claim 10, wherein the gravity-responsive switch is a plumb pivotally mounted in the reel body for rotational movement relative to the reel body, and at least one electrical contact disposed within the reel body and arranged for wiping contact with the plumb to close an electrical circuit through the switch and indicator means.

* * * * *